April 11, 1967 W. G. SMITH 3,313,572
QUICK-RELEASE SAFETY SEAT BELT
Filed Nov. 9, 1964 3 Sheets-Sheet 1
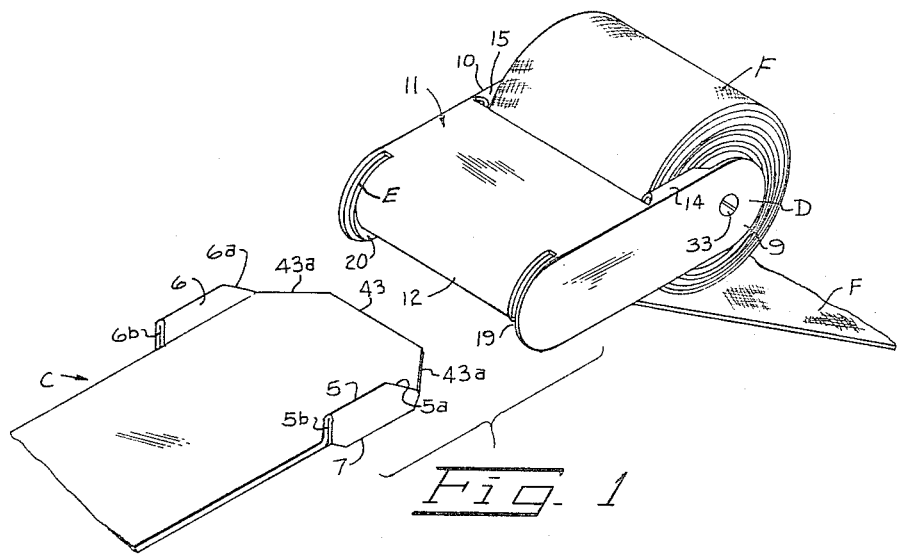
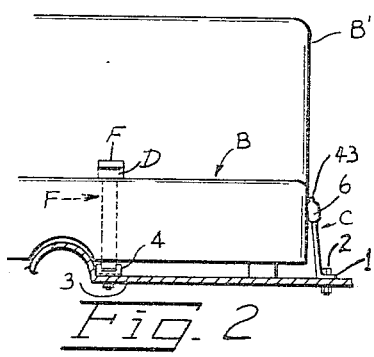
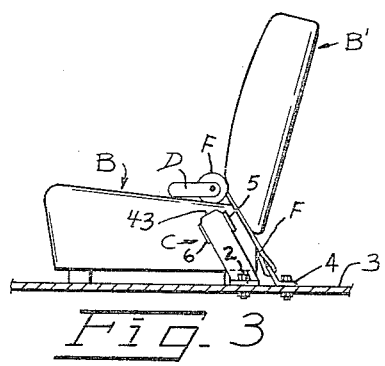
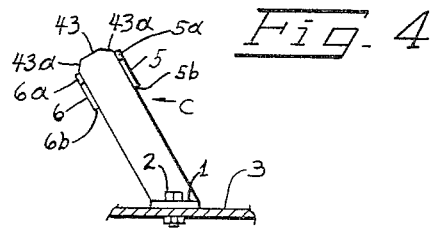
INVENTOR.
WILLIAM G. SMITH
BY
William R. Piper
ATTORNEY April 11, 1967     W. G. SMITH     3,313,572
QUICK-RELEASE SAFETY SEAT BELT Filed Nov. 9, 1964

INVENTOR.
WILLIAM G. SMITH
BY
William R. Piper
ATTORNEY

April 11, 1967  W. G. SMITH  3,313,572
QUICK-RELEASE SAFETY SEAT BELT
Filed Nov. 9, 1964  3 Sheets-Sheet 3
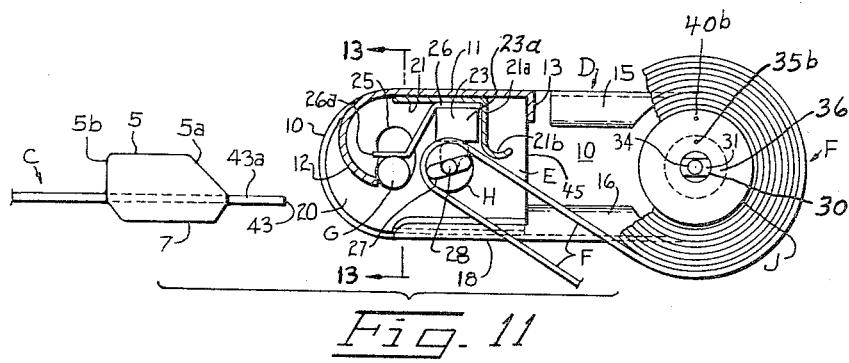
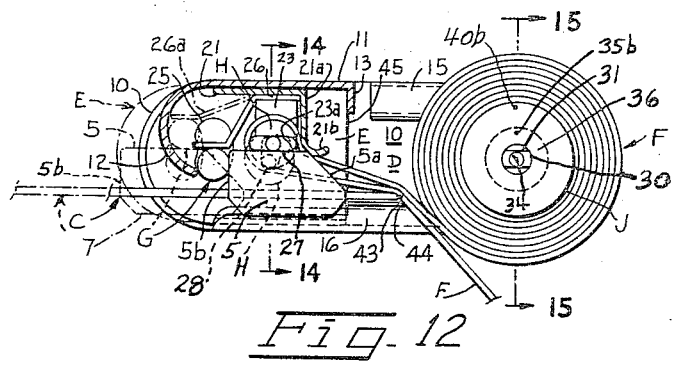
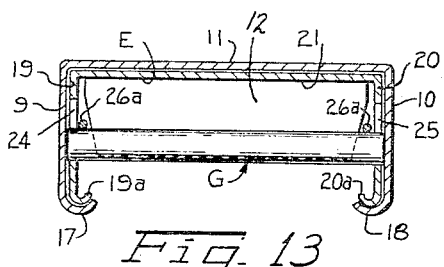
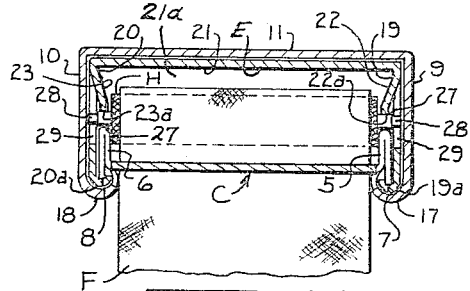
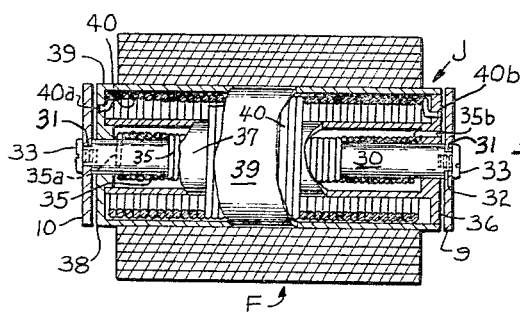
INVENTOR.
WILLIAM G. SMITH
BY
William R. Piper
ATTORNEY

United States Patent Office 3,313,572
Patented Apr. 11, 1967

3,313,572
QUICK-RELEASE SAFETY SEAT BELT
William G. Smith, San Lorenzo, Calif., assignor of forty percent to Robert P. Berryman, San Mateo, Calif.
Filed Nov. 9, 1964, Ser. No. 409,695
14 Claims. (Cl. 297—388)

The present invention relates to improvements in a quick-release safety seat belt, and it consists in the combination, construction and arrangement of parts as hereinafter described and claimed.

An object of my invention is to provide a quick-release safety seat belt that is an improvement over the safety seat belt shown in my copending application for patent, Ser. No. 319,326, filed Oct. 28, 1963. In my copending case, I disclose a safety seat belt that does not rest on the vehicle seat when the device is not in use. An anchor plate is connected directly to the floor or chassis of the vehicle by a flexible metal strip that extends through the space provided between the seat and the seat back. The anchor plate is disposed near to the point where the top of the seat meets the seat back and the plate is pivotally connected to the free end of the metal strip.

The safety seat belt has one end anchored to the floor or to the vehicle chassis and the other end is wound upon a spring-biased drum that is carried by a single buckle. The buckle is supported on the side of the vehicle seat when not in use and the unused portion of the belt is wound upon the drum. The metal strip holds the anchor plate rigidly enough so that a person occupying the seat need use only one hand to remove the buckle from its support at the side of the seat and then move the buckle across the lap of the person and connect it to the anchor plate. During this movement the necessary portion of the safety seat belt to extend across the person's lap will unwind from the drum as needed. The buckle will not rest on the person's lap when it is connected to the anchor plate but will be disposed adjacent to the side of the person. A locking lever secures the buckle to the anchor plate and the buckle is freed from the anchor plate when the locking lever is swung into released position.

In my present invention I do away with the locking lever for connecting the buckle to the anchor plate. Instead I provide a buckle that has a housing for a main lock body and the main lock body secures the buckle to the anchor plate when the buckle is connected to the anchor plate. The buckle can be instantly freed from the anchor plate when the operator pulls on the housing to move the housing with respect to the main lock body. The housing carries a cam that will actuate mechanism for disconnecting the main lock body from the anchor plate when the housing is moved relatively to the main lock body. The housing also carries a spring-biased drum of a novel construction for winding up any unused portion of the belt.

The main lock body carries a knurled cylindrical bar that has the belt passed around it after the belt leaves the drum. During the moving of the buckle from one side of a person using it to the other side, the belt will unwind from the drum as needed and the bar will freely rotate as the belt passes around it. However, when the buckle is secured to the anchor plate, the movement of the anchor plate into the buckle for the coupling of the two together, will actuate means for preventing further rotation of the bar and this means will also press the belt against the bar for preventing any slippage of the belt around the bar. The belt is thus anchored to the bar which will take any strain to which the belt might be subjected in case of an accident and there will be no further pull on the portion of the belt between the bar and the drum to unwind any more belt from the drum so long as the buckle remains coupled to the anchor plate.

The buckle is designed so that it can be made from sheet metal stampings. The device is simple in construction and will withstand the number of pounds pressure on the belt and buckle designated by safety engineers and due to an accident.

Other objects and advantages will appear as the specification continues. The novel features of the invention will be set forth in the appended claims.

Drawings

For a better understanding of my invention, reference should be made to the accompanying drawings, forming part of this specification in which:

FIGURE 1 is an isometric view of the safety seat belt buckle and anchor plate shown about to be connected together.

FIGURE 2 is a diagrammatic front view of a part of a vehicle seat and shows the anchor plate arranged at the side of the seat and secured to the vehicle floor. A safety seat belt has one end connected to the vehicle floor and has its other end extending between the seat and seat back and wound upon a spring-biased drum that is carried by a buckle. The buckle is disposed on the opposite side of the person in the seat from the side occupied by the anchor plate.

FIGURE 3 is a diagrammatic side view of FIGURE 2.

FIGURE 4 is an enlarged view of the anchor plate.

FIGURE 11 is a longitudinal section through the complete buckle with the main lock body slidably mounted in the buckle housing. The figure also shows a side elevation of the anchor plate ready to be connected to the main lock body in the buckle housing.

FIGURE 12 is a longitudinal section similar to FIGURE 11, but the anchor plate has been connected to the main lock body in the buckle housing. The figure also illustrates the buckle housing moved with respect to the main lock body for releasing the main lock body and the buckle housing from the anchor plate.

FIGURE 13 is a transverse section taken through the buckle housing and main lock body along the line 13—13 of FIGURE 11.

FIGURE 14 is a transverse section through the buckle housing, main lock body and anchor plate when the parts are interconnected and it is taken along the line 14—14 of FIGURE 12 when looking in the opposite direction from that of FIGURE 13. FIGURE 14 also indicates by dot-dash lines the movement between the buckle housing and the main lock body for releasing the anchor plate.

FIGURE 15 is a transverse section through the buckle housing showing the construction of the dual spring-biased drum and is taken along the line 15—15 of FIGURE 12.

While I have shown only the preferred form of my invention, it should be understood that various changes or modifications may be made within the scope of the annexed claims without departing from the spirit thereof.

Detailed description

In carrying out my invention on the quick-release safety seat belt buckle, I provide an anchor plate indicated generally at C and preferably made from a strip of metal, see FIGURE 4. This anchor strip has an end 1 that is bent at an angle and connected to a floor or vehicle chassis by a bolt 2. Both FIGURES 2 and 3 show the floor 3 of a vehicle. The anchor plate C is placed adjacent to the side of a vehicle seat B, and it extends at an angle as shown in FIGURES 3 and 4. A safety seat belt F has one end looped and connected to a floor bracket 4. The belt extends upwardly and between the vehicle seat B and a seat back B', see FIGURE 3. The free end of safety seat belt F is passed through a belt-clamping mechanism hereinafter described and is then wound upon a spring-biased drum that is carried by the buckle housing. Before describing these parts in detail it is best to set forth the structure of the anchor plate.

Figure 10:
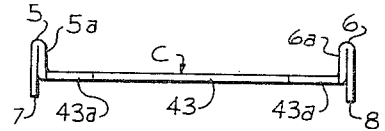
FIGURE 10 is a front elevation of the anchor plate.

A side view of the anchor plate C is shown in FIGURE 11, a front end view is shown in FIGURE 10 and an isometric view in FIGURE 1. It will be noted from these figures that the anchor plate is preferably stamped out from sheet metal and it has upwardly extending side guide members 5 and 6 at its free end. The purpose of these will be described hereinafter. The portions of the metal that are bent upwardly to form the guide members 5 and 6 have their outer ends bent downwardly and these portions 7 and 8 have their lower edges projecting below the bottom of the anchor plate C. These depending portions 7 and 8 can be likened to guide runners and serve a purpose which will be presently set forth.

Figure 5:
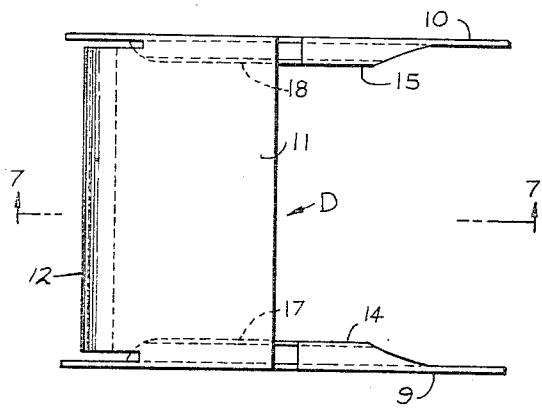
FIGURE 5 is a top plan view of the buckle housing shown substantially full size.

I provide a combined housing and safety seat belt buckle. The buckle housing is indicated generally at D in FIGURES 5, 6 and 7 and it has a main lock body indicated generally at E, operatively connected thereto, see FIGURES 8, 9, 11 and 12. It will be noted from FIGURE 1 that the buckle housing D has two side walls 9 and 10, see also FIGURES 5, 6 and 7. The two side walls are interconnected by a transversely extending top portion 11 and the front end of this top portion is curved downwardly and inwardly at 12, see FIGURE 7, to form a cam member. The transversely exending top portion 11 has a downwardly extending flange 13, see FIGURES 7, and 11, which will give rigidity to the top portion and to the housing D. The flange 13 also acts as a stop for the main lock body E. FIGURE 5 shows the sides of the downwardly curved cam as being spaced inwardly from the inner surfaces of the side walls 9 and 10. The purpose of this will be described later.

Figure 7:
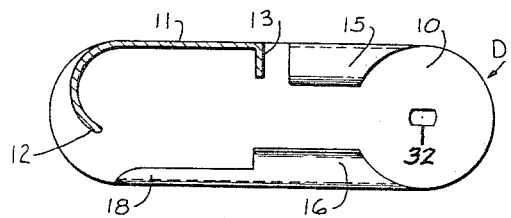
FIGURE 7 is a longitudinal section through the housing and is taken along the line 7—7 of FIGURE 5.

It will be noted from FIGURES 5 and 11 that the transversely extending top portion 11 covers approximately one-half of the length of the buckle housing D. The side walls 9 and 10 project to the right of the top portion 11 as seen in FIGURES 5 and 7 and the upper edges of the side members have extensions that are bent inwardly and downwardly to form upper side guides 14 and 15. Also the lower edges of the sides 9 and 10 have portions that are bent upwardly to form lower guides 16 for the safety belt roll indicated generally at F. These lower guides 16 will also act as guides for the portion of the belt F that feeds off from the roll, see FIGURE 11.

Figure 6:
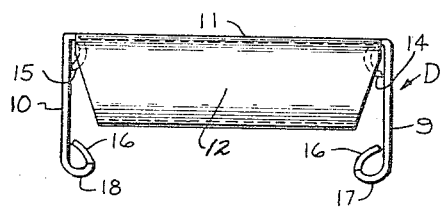
FIGURE 6 is a front elevation of FIGURE 5.

It will be further noted from FIGURES 6, 7 and 11, that the sides 9 and 10 not only have upwardly curved lower belt guides 16 but they also have upwardly curved guide channels 17 and 18 designed to slidably receive the main lock body E which will now be described.

Figure 9:
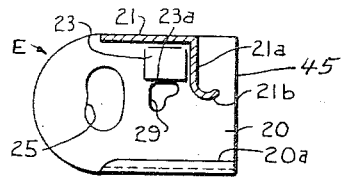
FIGURE 9 is a longitudinal section through the main lock body and is taken along the line 9—9 of FIGURE 8.
Figure 8:
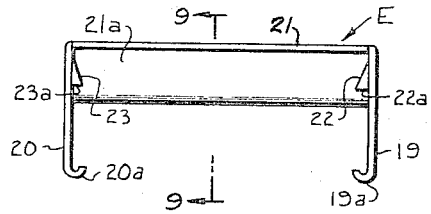
FIGURE 8 is a front elevation of the main lock body.

FIGURES 8 and 9 show that the main lock body E has sides 19 and 20 and a transversely extending top portion 21 interconnects these sides. The main lock body has its sides 19 and 20 slidably received between the sides 9 and 10 of the housing D, see FIGURE 13, and the lower ends of the sides 19 and 20 are curved inwardly and upwardly as at 19a and 20a and ride in the curved portions 17 and 18 respectively. The transverse top portion 21 of the main lock body E is free to slide under the transverse top portion 11 of the buckle housing D. The left hand curved edges of the sides 19 and 20, note the curved edge of the sides 20 in FIGURE 9, can move through the slots provided between the side edges of the cam 12 in FIGURE 5, and the adjacent surfaces of the sides 9 and 10 when the buckle housing D is moved to the right in FIGURE 12 and with respect to the lock body E for freeing the anchor plate C from the lock body E. This will be described in the operation of the device. FIGURE 9, shows the transverse portion 21 with a downwardly extending portion 21a that has a curved lower end 21b designed to contact with one side of the safety belt F as it is fed from the spring-biased drum, see FIGURE 11.

In FIGURE 8, I show the sides 19 and 20 of the main lock body E with bent in portions 22 and 23 and these portions have lower edges 22a and 23a that parallel the planes of the transversely extending portions 11 and 21 of the housing D and main lock body E, respectively. The purpose of this will be set forth when describing the operation of the device. The main lock body carries a belt-gripping means.

FIGURES 9 and 13 show the main lock body E provided with arcuate-shaped slots 24 and 25 in the sides 19 and 20, respectively. A sliding lock bar G is cylindrical in shape and has its ends slidably received in the arcuate slots 24 and 25. A U-shaped wire spring 26 is secured to the undersurface of the transverse portion 21 of the main lock body E and this spring has its ends 26a, see FIGURE 11, yieldingly bearing against the sliding lock bar G and urging the bar into the lower ends of the arcuate slots 24 and 25. The purpose of this sliding lock bar will be set forth in the operation of the device.

The belt-gripping means includes a knurled gripping bar H, see FIGURES 11 and 14 which is cylindrical in shape and it has axially aligned trunnions provided with flat portions 27 and outer cylindrical portions 28. The side walls 19 and 20 of the main lock body E have substantially triangularly-shaped openings 29, see FIGURE 9, and these receive the cylindrical portions 28 of the trunnions that project from the ends of the knurled gripping bar H. Normally the trunnions 28 are received in the lower ends of the openings 29, and this is true when the buckle housing D is not connected to the anchor plate C.

Before describing the operation of the device it is best to set forth the construction of the spring-biased drum indicated generally at J in FIGURE 15, that will wind the excess belt F there around. This drum is also shown in FIGURES 11 and 12. The drum has a main shaft 30 and this shaft has non-circular trunnions 31 that are received in non-circular openings 32 provided in the sides 9 and 10 of the buckle housing D. Screws 33 are received in the threaded bores 34 provided in the ends of the non-circular trunnions 31, see FIGURE 15, and these screws secure the shaft 30 to the housing D and prevent the shaft from rotating. An inner coil spring 35 is mounted on the shaft 30 and has one end 35a anchored to the shaft 30 and has its other end 35b secured to a bushing 36 that is free to rotate on the shaft 30. The inner spring 35 acts as a torsional spring and when the bushing 36 is rotated on the shaft in one direction for winding up the spring and is then freed, the spring will rotate the bushing in the opposite direction until the spring returns to normal position.

The bushing 36 has an inner sleeve 37 that encloses the inner spring 35 and the shaft 30 and extends to another bushing 38 that is rotatably mounted on the other end of the shaft 30. The inner sleeve 37 is supported by the bushing 38 but is free to rotate with respect to the bushing. It is possible to have the inner sleeve 37 free to rotate independently of both bushings 36 and 38 while still being supported by them.

The bushing 38 has an outer sleeve 39 and this outer sleeve is spaced from the inner sleeve so as to form a compartment that will receive an outer torsional spring 40. The spring 40 has one end 40a, secured to the bushing 38 and has its other end 40b secured to the bushing 36. The outer sleeve 39 is rotatably supported by the periphery of the bushing 36. The free end of the belt F is secured to the outer sleeve 39.

It will be seen from this construction that the two torsional springs 35 and 40 cooperate with each other to in effect act as a single torsional spring. The outer sleeve 39 can be rotated with its bushing 38 to wind up the torsional spring 40 and then the bushing 36 that is connected to the torsional spring 40 will be rotated by the winding up of the spring 40 and will wind the inner torsional spring 35. When the two springs are wound up, then the free end of the safety seat belt F can be attached to the outer sleeve 39. The wound up springs 35 and 40 will tend to return to their normal positions and will rotate the outer sleeve 39 and bushing 38 and will also rotate the bushing 36 so as to wind up the belt. The wound up roll of belt F on the drum J is shown in FIGURES 1 and 12.

*Operation*

From the foregoing description of the various parts of the device the operation thereof may be readily understood. When the safety seat belt is not used, the buckle which comprises the housing D and the main lock body E rests on the seat B and is placed near the back seat B' so as to be in an out-of-the-way position, see FIGURE 3. I have already explained how the anchor plate C is secured to the vehicle floor 3 or to the vehicle chassis, not shown, by means of the bolt 2. When the safety seat belt is not used, the parts will be in the positions shown in FIGURES 2 and 3. There will be no unsightly seat belt strewn across the top of the seat B, or lying on the floor.

A person sitting on the seat B and desiring to fasten the safety seat belt around him, grasps the buckle housing D with his right hand. He then moves the buckle across in front of him and the safety seat belt F will unwind from the spring-biased drum J during this movement. The dual torsion springs 35 and 40 will be wound up so as to rotate the drum J in the opposite direction for winding the unused portion of the belt F back onto the drum when the buckle housing D is returned back to its initial position shown in FIGURE 3.

The free end 43 of the anchor plate C has bevelled corners 43a for aiding in guiding the anchor plate C into the main lock body E. FIGURE 11 shows the belt buckle comprising the housing D and the main lock body E approaching the edge 43 of the anchor plate C. As the buckle is being coupled to the anchor plate, the plate C will move under the sliding lock bar G and the upwardly extending guide members 5 and 6 will have their inclined forward edges 5a and 6a contact with the underside of the sliding lock bar G to raise it so that the ends of the bar will move upwardly in the arcuate slots 24 and 25 provided in the sides 19 and 20 of the main lock body E. The two ends 26a of the U-shaped spring 26 that yieldingly bear against the top of the sliding lock bar G will be swung upwardly during the lifting of the lock bar as is clearly shown by the dot-dash lines in FIGURE 12.

The guide runners 7 and 8 of the anchor plate C will be received in the lower curved channels 19a and 20a formed at the bottoms of the sides 19 and 20 of the main lock body E, see FIGURE 14. The further movement of the anchor plate C into the main lock body will cause the upwardly extending guide members 5 and 6 to move beyond the sliding lock bar G and this will permit the yielding ends 26a of the U-shaped spring to move the lock bar back down into the bottom of the arcuate slots 24 and 25 as clearly shown in FIGURE 12. This will position the lock bar G in back of the guide members 5 and 6 and the lock bar will bear against the vertical rear edges 5b and 6b and prevent the removal of the anchor plate C from the main lock body E. Any force exerted by the vertical edges 5b and 6b against the sliding lock bar G will tend to force the bar into the lower portion of the arcuate slots 24 and 25 because of the particular curve in the slots. There will be no tendency for the edges 5b and 6b to lift the sliding lock bar G into the tops of the arcuate slots 24 and 25. The main lock body E, will be received between the lock bar G, and the stop flange 13 of the buckle housing D. The anchor plate C will be secured to the main lock body E.

It will also be noted that as the anchor plate C enters the main lock body E, the same upwardly extending guide members 5 and 6 will have their inclined front edges 5a and 6a contact with the flat portions 27 of the trunnions that extend from the ends of the knurled gripping bar H, see FIGURE 12. It will further be noted that the upper edges of the guide members 5 and 6 are parallel to the lower edges 22a and 23a of the inwardly bent portions 22 and 23 formed in the sides 19 and 20 of the main lock body E, see FIGURE 14. The flattened portions 27 of the trunnions are therefore held from rotating because they are received between the top edges of the guide members 5 and 6 and the lower edges 22a and 23a of the inwardly bent portions 22 and 23. The knurled belt-gripping bar H, forms a part of the belt gripping means.

The outer cylindrical surface of the gripping bar H is knurled and the portion of the belt F that feeds from the drum J will be passed around this gripping bar cylindrical surface as clearly shown in FIGURE 11 and then the free end of the belt is conected to the vehicle floor bracket 4. When the anchor plate C is fully received within the main lock body E, the depending part 21a with its curved lower end 21b on the main lock body E will bear against the adjacent portion of the belt F and will force this portion against the knurled outer cylindrical surface of the belt-gripping bar H, see FIGURE 12. This is another part of the belt-gripping means.

As soon as the knurled gripping bar H is prevented from rotating, by the flattened trunnion portions 27 being received between the top edges of the guides 5 and 6 and the lower edges 22a and 23a of the inwardly indented portions 22 and 23, the belt F will be firmly gripped and is prevented from sliding around the gripping bar. When the flat portions 27 of the trunnions for the gripping bar H are lifted by the guide members 5 and 6, the cylindrical portions 28 of the trunnions will be raised to the top of the triangular openings 29 in the sides 19 and 20 of the main lock body, see FIGURES 12 and 14.

When the buckle comprising the housing D and the main lock body E are coupled to the anchor plate C, as shown in the full line sectional view of FIGURE 12, the safety seat belt securely fastens the person to the seat of the vehicle and to either the floor or to the chassis of the vehicle. The buckle housing D will be disposed at the side of the seat A, because the anchor plate C, is placed there. The unused portion of the belt F will remain wound upon the spring-biased drum J.

Any pull on the belt F caused by a quick stop or an accident will merely cause the belt to pull on the knurled gripping bar which cannot rotate. The curved lower end 21b of the depending part 21a will keep the belt pressed against the knurled gripping bar H, and will prevent any slippage of the belt around the bar. The bar will have about 270° of its surface contacted by the belt. The pull on the bar H will be transferred to the main lock body E, because the bar is carried by the body. The body E also carries the sliding lock bar G and this bar bears against the edges 5b and 6b of the guide members 5 and 6 on the anchor plate C. This will hold the anchor plate C in the main lock body E, and since the anchor plate is secured to the vehicle floor 3, or chassis, the person will be securely held in the seat.

It will be noted from FIGURE 14, that when the anchor plate C is received in the main lock body E, then the guide runners 7 and 8 are received in the curved portions 19a and 20a of the main lock body. The curved portions 19a and 20a connect the anchor plate to the sides 19 and 20 of the main lock body and form a box-like structure with the top 21 that is extra strong. The runners 7 and 8 prevent the sides 19 and 20 of the main lock member from springing outwardly when under any pulling tension.

The safety seat belt will therefore hold against any accident that will bring the vehicle to an abrupt stop and prevent the person from being moved out of the seat. It will be seen from FIGURES 11 and 12 that the sides 19 and 20 of the main lock body have vertical edges 45 and these edges bear against the inwardly extending flange 13 that is integral with the transverse top portion 11 of the housing D. The edges 45 when abutting the flange 13 as stops to prevent further movement of the housing D to the left in FIGURE 11 with respect to the main lock body E.

It is a simple matter to quickly release the buckle from the anchor plate when the person desires to free himself from the safety belt. This is accomplished by moving the housing D to the right in FIGURE 11, this movement being relative to the main lock body E that is held against movement by the anchor plate C which is anchored to the vehicle floor or chassis. In moving the housing D to the right in FIGURE 11 with respect to the main lock body E, the person grips the sides 9 and 10 of the housing and then moves the housing to the right. The curved edges of the sides 19 and 20 of the lock body E will be received in the spaces provided between the side edges of the downwardly curved cam 12 of the buckle housing D and the adjacent inner surfaces of the sides 9 and 10 as the buckle housing is moved to the right in FIGURE 12 and with respect to the lock body E, the latter being held against movement by the lock bar G engaging with the rear edges 5b of the anchor plate C. It is difficult to show this movement with respect to the main lock body E because so many parts of the buckle housing D would have to be shown in a dot-dash line position to indicate the movement.

FIGURE 12 has therefore been drawn to indicate this movement, but the housing D is shown in full lines while the main lock body E, in its moved position with respect to the housing D, is shown by the dot-dash lines. The movement of the housing D to the right in FIGURE 11 with respect to the main lock body E will cause the curved cam 12 to move and engage with the underside of the sliding lock bar G and raise this bar so that its ends will be received at the top of the arcuate slots 24 and 25. The vertical raising of the sliding lock bar G by the cam 12 is sufficient to lift the bar above the vertical rear edges 5b and 6b of the guide members 5 and 6. When this takes place it is a simple matter to continue moving the buckle housing D to the right with respect to the anchor plate C and the sliding lock bar G will ride over the top edges of the members 5 and 6 and will permit the buckle housing D to be pulled free from the anchor plate C. The knurled gripping bar H will now drop to the bottoms of the triangular slots 29 and this will space the bar from the curved portion 21b of the depending part 21a and permit the buckle housing to be moved back onto the seat. The spring-biased drum J will wind up the excess belt F as this movement takes place.

I claim:
1. In combination:
(a) a buckle housing;
(b) a spring-biased drum carried by said housing;
(c) a main lock body movably carried by said housing and having belt-gripping means;
(d) a belt extending through said belt-gripping means and having one end anchored to a vehicle and its other end wound upon said spring-biased drum;
(e) an anchor plate secured to said vehicle and being receivable in said main lock body when said housing and said main lock body are moved toward said anchor plate for coupling said main lock body to said anchor plate, said drum feeding belt therefrom as needed during this movement;
(f) means on said anchor plate when said plate is coupled to said main lock body for actuating said belt-gripping means for causing the latter to grip said belt;
(g) locking means in said main lock body cooperating with the means on said anchor plate for securing said anchor plate to said lock body;
(h) said belt-gripping means including a knurled cylindrical bar rotatably carried by said main lock body;
(i) the portion of said belt extending through said belt-gripping means also being passed around said bar; said bar freely rotating and permitting the belt to move around it as said housing and said main lock body are moved toward said anchor plate for connection therewith; and
(j) said main lock body and said anchor plate with said knurled bar having means for stopping rotation of said bar when said anchor plate is coupled to said main lock body; said main lock body also having means for pressing the portion of the belt around said bar, down upon said bar for preventing any slipping of said belt around said bar.

2. In combination:
(a) a main lock body having side walls with openings therein;
(b) a belt-gripping bar having trunnions rotatably received in said openings, said trunnions having transversely-extending flattened portions;
(c) an anchor plate receivable in said main lock body and having means for contacting with said flattened portions of said belt-gripping bar for preventing rotation of said bar;
(d) the side walls of said main lock body having portions with edges against which the flattened portions of said trunnions can contact;
(e) said anchor plate means also engaging with said flattened portions when said anchor plate is received in said main lock body and moving said flattened portions into contact with said edges on the portions in said lock body;
(f) whereby said flattened portions are prevented from rotating by both said anchor plate means and the edges of said lock body portions and will prevent the rotation of said belt-gripping bar.

3. In combination:
(a) a buckle housing having a top and integral sides that are spaced from each other;
(b) said sides having their lower edges formed into guides that are arcuate in cross section;
(c) a main lock body slidably mounted in said housing and having a top underlying said housing top and having integral sides that parallel the housing sides and are spaced inwardly therefrom, the main lock body sides having their lower edges formed into guides that are arcuate in cross section and are slidably received in said housing guides;
(d) an anchor plate removably received in said main lock body and having side guides with lower edges slidably received in said main lock body guides, said anchor plate being spaced from the top of said main lock body when said plate is received in said body;
(e) whereby a box-like structure is formed with the top consisting of the tops of the housing and body, the side consisting of the sides of the housing and body, and the bottom consisting of said anchor plate, the side guides of said plate with their lower edges received in said body guides preventing any outward lateral spreading of the lower edges of said body side walls, and the lower edges of said body sides preventing any outward lateral spreading of the lower edges of said housing side walls, should there be any force exerted on the anchor plate, body or housing tending to spread the lower ends of the body or housing sides;

(f) the side guides of said anchor plate having rear edges;
(g) a lock bar carried by said main lock body; and
(h) spring means for yieldingly urging said lock bar in back of said rear edges of said side guides for preventing accidental withdrawal of said anchor plate from said main lock body when said anchor plate is received in said main lock body.

4. In a device of the type described:
(a) a buckle housing;
(b) a main lock body slidably mounted in said housing and having a belt gripping member;
(c) a cylindrical belt-gripping bar rotatably carried by said main lock body and being movable toward said belt-gripping member;
(d) an anchor plate receivable in said main lock body and having means for engaging with said belt-gripping bar for moving said bar toward said belt-gripping member and for preventing rotation of said bar when said anchor plate is moved into said main lock body;
(e) a belt having one end connected to said housing and being freely movable between said bar and said belt-gripping member, said cylindrical bar being free to be rotated by said belt during the belt movement, said belt being gripped between said bar and said member when said anchor plate is received in said main lock body and said cylindrical bar is prevented from rotating;
(f) a lock bar carried by said main lock body; and
(g) spring means carried by said main lock body for yieldingly urging said lock bar into locking engagement with said first-named means for securing said anchor plate to said main lock body when the latter is moved into the former.

5. The combination as set forth in claim 1: and in which
(a) said buckle housing is manually movable with respect to said main lock body into released position and carries means for releasing said locking means from said means on said anchor plate;
(b) whereby said anchor plate is freed from said main lock body.

6. In combination:
(a) a main lock body having side walls with openings therein;
(b) a belt-gripping bar having trunnions rotatably received in said openings, said trunnions having transversely-extending flattened portions; and
(c) an anchor plate receivable in said main lock body and having means for contacting with said flattened portions of said belt-gripping bar for preventing rotation of said bar.

7. The combination as set forth in claim 2: and in which
(a) a belt-engaging member carried by said main lock body and normally being spaced from said belt-gripping bar a sufficient distance to permit the ready movement of a belt therebetween;
(b) said bar when moved by said anchor plate means as said plate is received in said main lock body due to said means moving said flattened portions into contact with the edges on said portions of the lock body, also being moved toward said belt-engaging member for causing the belt to be gripped between said bar and said member for preventing slippage of the belt around the stationary bar.

8. In combination:
(a) a buckle housing;
(b) a main lock body movably carried by said housing and having side walls with openings therein;
(c) a lock bar having its ends slidably received in said openings;
(d) spring means for yieldingly holding said lock bar so that its ends will be positioned at the lower ends of said openings;
(e) an anchor plate receivable between the sides of said main lock body and having side guide members for engaging with said lock bar for lifting it against the pressure of said spring means and moving the bar ends toward the upper ends of said openings;
(f) said side guide members having rear edges that are moved beyond said lock bar when said anchor plate is received in said main lock body; whereby said spring means will move said lock bar in back of said rear edges for securing said anchor plate to said main lock body; and
(g) cam means carried by said buckle housing and engaging with said lock bar when said housing is manually moved into released position with respect to said main lock body for lifting said lock bar above the rear edges of said side guide members for freeing said guide members and permitting said anchor plate to be separated from said main lock body.

9. The combination as set forth in claim 2: and in which
(a) the openings in the side walls of said main lock member are arcuate in shape with the lengths of said openings extending substantially perpendicular to the plane of said anchor plate when the latter is received in said main lock body, and the lower portions of said openings extending downwardly at an angle so that the edges of these lower portions will tend to guide said lock bar toward the bottoms of said openings when pressure is exerted by the rear edges of said side guide members against said lock bar caused by a force tending to pull said anchor plate from said main lock body.

10. The combination as set forth in claim 3: and in which
(a) a spring-biased drum mounted on said buckle housing;
(b) a safety belt having one end secured to said drum and having a portion wrapped around said drum;
(c) a cylindrical belt-gripping bar rotatably carried by said main lock body and having the portion of the belt extending from said drum wrapped around said bar with the free end of said belt being secured to a vehicle; and
(d) a belt-contacting member carried by said main lock body and positioned near said belt-gripping bar for aiding in guiding the belt toward the belt-gripping bar;
(e) the side guides of said anchor plate moving said belt-gripping bar toward said belt-contacting member when said anchor plate is received in said main lock body for causing said belt to be gripped between said belt-gripping bar and said belt-contacting member;
(f) said side guides also preventing rotation of said belt-gripping bar.

11. In combination:
(a) a lock body;
(b) a first locking member carried by said lock body;
(c) an anchor plate connectable to said lock body;
(d) a second locking member carried by said anchor plate and cooperating with said first locking member for interconnecting said anchor plate to said lock body when said anchor plate is moved in one direction with respect to said lock body;
(e) a housing slidably connected to said lock body; and
(f) means carried by said housing for releasing said first locking member from said second locking member when said housing is moved with respect to said lock body and in an opposite direction away from said anchor plate.

12. In a device of the type described:
(a) a buckle housing;

(b) a main lock body slidably mounted in said housing and having a belt gripping member;
(c) a cylindrical belt-gripping bar rotatably carried by said main lock body and being movable toward said belt-gripping member;
(d) an anchor plate receivable in said main lock body and having means for engaging with said belt-gripping bar for moving said bar toward said belt-gripping member and for preventing rotation of said bar when said anchor plate is moved into said main lock body;
(e) a belt having one end connected to said housing and being freely movable between said bar and said belt-gripping member, said cylindrical bar being free to be rotated by said belt during the belt movement, said belt being gripped between said bar and said member when said anchor plate is received in said main lock body and said cylindrical bar is prevented from rotating.

13. The combination as set forth in claim 4; and in which
(a) said housing having means for releasing said lock bar from locking engagement with said first-named means when said housing is moved in a predetermined direction with respect to said main lock body.

14. In combination:
(a) a buckle housing having a top and integral sides that are spaced from each other;
(b) said sides having their lower edges formed into guides that are arcuate in cross section;
(c) a main lock body slidably mounted in said housing and having a top overlying said housing top and having integral sides that parallel the housing sides and are spaced inwardly therefrom, the main lock body sides having their lower edges formed into guides that are arcuate in cross section and are slidably received in said housing guides;
(d) an anchor plate removably received in said main lock body and having side guides with lower edges slidably received in said main lock body guides, said anchor plate being spaced from the top of said main lock body when said plate is received in said body;
(e) whereby a box-like structure is formed with the top consisting of the tops of the housing and body, the sides consisting of the sides of the housing and body, and the bottom consisting of said anchor plate, the side guides of said plate with their lower edges received in said body guides preventing the outer lateral spreading of the lower edges of said body side walls, and the lower edges of said body sides preventing any outward lateral spreading of the lower edges of said housing side walls, should there be any force exerted on the anchor plate, body or housing tending to spread the lower ends of the body or housing sides; and
(f) a spring biased drum carried by said buckle housing.

References Cited by the Examiner
UNITED STATES PATENTS

| | | | |
|---|---|---|---|
| 3,206,137 | 9/1965 | Snyderman | 242—107.4 |
| 3,227,489 | 1/1966 | Stubblefield | 297—388 |
| 3,231,307 | 1/1966 | Smith | 297—388 |
| 3,233,296 | 2/1966 | Whittingham | 24—78 |
| 3,248,148 | 4/1966 | Board et al. | 297—388 |
| 3,249,386 | 5/1966 | Board et al. | 297—388 |

FRANK B. SHERRY, *Primary Examiner.*

C. A. NUNBERG, *Examiner.*